Jan. 8, 1963
M. O. EVANICK ETAL
3,072,367
AZIMUTH-STABILIZED BALLOON GONDOLA
Filed June 28, 1961
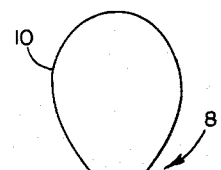
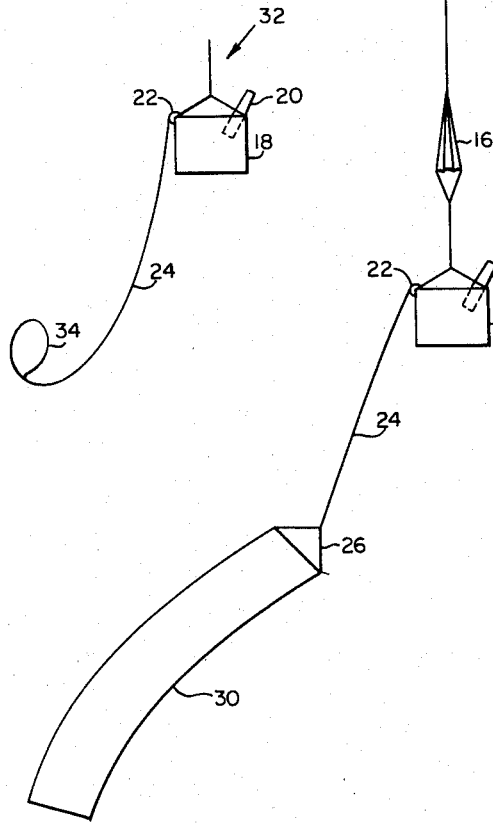
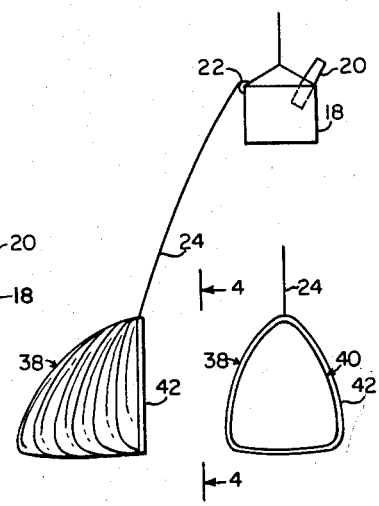
INVENTORS
MICHAEL O. EVANICK
JOHN W. SPARKMAN, JR.
BY *Louis Sheldon*
ATTORNEY

United States Patent Office 3,072,367
Patented Jan. 8, 1963

3,072,367
AZIMUTH-STABILIZED BALLOON GONDOLA
Michael O. Evanick, St. Paul, and John W. Sparkman, Jr., Mahtomedi, Minn., assignors to the United States of America as represented by the Secretary of the Navy
Filed June 28, 1961, Ser. No. 120,451
10 Claims. (Cl. 244—32)
(Granted under Title 35, U.S. Code (1952), sec. 266)

The invention described herein may be manufactured and used by or for the Government of the United States of America for governmental purposes without the payment of any royalty thereon or therefor.

This invention relates to balloons of the type designed to float freely at ceiling altitude and is concerned more particularly with the azimuth-stabilization of a gondola suspended from such a balloon.

A gondola suspended from a load line hanging from a free balloon has a tendency to turn about its vertical axis. This turning is objectionable when the gondola carries equipment such, for example, as a camera or telescope which is to observe for a sustained period of time a star, such as Venus, or other objective which subtends a relatively small angle.

Efforts to solve this problem heretofore have entailed the use of heavy and expensive equipment or for other reasons have left much to be desired.

It is an object of the invention to provide inexpensive light weight apparatus for automatiacally azimuth-stabilizing a balloon-suspended gondola.

Another object is to bring the wind into play to rotation-stabilize the gondola.

Further objects and advantages of the invention will appear as the description proceeds.

The invention will be better understood on reference to the following description and the accompanying more or less schematic drawing, wherein:

FIGS. 1, 2, and 3 show three different forms of the invention.

FIG. 4 is taken at 4—4 in FIG. 3.

Referring now more particularly to the drawing, there is shown at 8 a high altitude balloon system in flight and comprising a balloon 10 containing helium or other lift gas having a load line 12 passing through a line cutter 14, which may be an electrically fired "squib," and suspending a collapsed parachute 16 which in turn suspends a gondola 18 equipped with scientific equipment such as a telescope or camera 20 and telemetering apparatus (not shown). The gondola 18 is shown as being of the open basket type for convenience, although it could be a sealed capsule with or without a crew. Mounted on the gondola 18 is a winch 22 to which one end of a nylon or other suitable line 24 is attached and about which the line is wound, the other end of the line being connected, in the form shown in FIG. 1, to an end of a vane 30. In operation, the vane 30 is preferably left outside the gondola, and the line 24 is payed out from the winch to the extent necessary to locate the vane at a position where, by virtue of the difference in altitude between the vane and the balloon 10, the wind shear due to the difference in wind speeds or wind directions will cause the vane to act as a drogue, held in a plane parallel to the direction of the wind in which it is immersed, and thus pull radially in the latter direction on and azimuth-stabilize the gondola 18. Now the telescope 20 can be adjusted as necessary to maintain the fix as long as the observation is desired to last. Any tendency of the gondola to rotate about its vertical axis in reaction to any such adjustment will be overcome by the action of the wind on the vane 30. The manner of telescope adjustment, whether manual or otherwise, forms no part of this invention. The winch could be controlled manually or by timer or pressure switch.

The vane 30 may be formed of any suitable strong light weight inelastic flexible sheet material. Lightness in weight is desired since heavy sheet material will require a larger and therefore more expensive balloon in order to reach the same ceiling altitude with the same payload. For the manufacture of balloons, film of polyethylene is in common use, and is extruded as a tube and received from the manufacturer in layflat form on a roll. This film usually has a layflat width (i.e., half-circumference) of 54″. A film thickness of 2 mils, weighing about 1 pound per 10 feet of length, is suitable for the purpose of the invention. The length of the vane 30 and payed-out line 24 may be varied, dependent on, among other things, the anticipated force of the wind acting on the vane. A flight employing a 49,000 cu. ft. balloon floating at an altitude of 5,780 feet, with an 8′ diameter loaded gondola 18 weighing 2,520 pounds, a vane 200 feet long and about 100 feet below the base of the balloon and with the line payed out 200 feet operated successfully in a 15 to 18 knot wind. Instead of layflat tubing, sheeting could be used.

FIG. 2 shows a modified balloon system 32, wherein the drogue, instead of being a vane as in FIG. 1, takes the form of an auxiliary balloon 34 containing lift gas and of substantially smaller size than the balloon 10. The auxiliary balloon 34 is secured to the outer end of the anchor line 24 and is designed to have a ceiling altitude substantially different from that of the balloon 10, and preferably different from the level of the winch 22, and can be made to float at selectively different altitudes within a range dependent on the difference between its ceiling altitude and the level of the winch. Thus, if the ceiling altitude of the balloon 34 is higher (or lower) than the winch when the balloon 10 is at its ceiling altitude, the winch can be turned to reduce the amount of line 24 payed out and thus lower (or raise) the balloon 34. For balloon ceiling altitudes up to about 50,000 feet a difference in altitude of 2000 to 3000 feet between the balloon ceiling altitude and the auxiliary balloon ceiling (or other floating) altitude is desirable. For a higher main balloon ceiling altitude, the difference in floating altitude between the main and drogue balloons should be greater, owing to the smaller wind speed differences at higher altitudes. A substantial difference either in the directions or in the speeds of the winds at the respective levels of the envelopes will produce the desired drogue effect. For the reason, among others, that the drogue balloon 34 can be made smaller and therefore cheaper for a lower ceiling altitude than for a higher ceiling altitude, a lower ceiling altitude auxiliary balloon is preferred.

For altitudes up to about 80,000 feet the drogue may take the form of a wind scoop 38 (FIGS. 3 and 4) attached to the outer end of the line 24. The lip 40 of the scoop 38 may comprise a flexible hose 42 which is normally collapsed when the scoop is not in use and can be inflated in any suitable manner, as by a cartridge (not shown), to hold the scoop mouth open as shown.

An adjustable counterweight may be carried by the gondola 18 diametrically opposite the location of the winch 22 to offset any tendency of the drogue of any of the forms of the invention to cause the gondola to list.

It is apparent from the foregoing that there are provided in accordance with the invention simple, rugged, inexpensive, and dependable means for rotation-stabilizing a balloon-suspended gondola.

While preferred embodiments have been described in some detail, they should be regarded as examples of the invention and not as restrictions or limitations therein as many changes may be made in the construction and arrangement of the parts without departing from the spirit of the invention.

We claim:

1. A free balloon system having a predetermined ceiling altitude and comprising a balloon suspending a gondola having a tendency to rotate about the suspension axis, and a drogue connected to the gondola and immersed in the atmosphere where the wind is shear to the wind acting on the balloon when the system is at ceiling altitude for azimuth-stabilizing the gondola.

2. A free balloon system comprising a balloon and a load suspended from the balloon, the load including a gondola having a tendency to rotate about the axis of suspension, and a drogue anchored to the gondola and immersed in the atmosphere where the wind is shear to the wind acting on the balloon.

3. The structure of claim 2, characterized in that the drogue is substantially lower than the balloon.

4. The structure of claim 1, characterized in that the drogue is formed of strong sheet material to withstand upper atmospheric shear winds and is of minimum weight to enable the balloon to carry maximum payload to ceiling altitude.

5. The structure of claim 1, characterized in that the drogue comprises a substantially rectangular elongated piece of sheet material suspended from a peripheral part of the gondola.

6. The structure of claim 2, characterized in that the system is free and has a predetermined ceiling altitude, and the drogue comprises a relatively small balloon having a ceiling altitude below the first mentioned balloon when the system is at ceiling altitude.

7. The structure of claim 1, characterized in that the drogue comprises a wind scoop.

8. The structure of claim 1, and means for varying the elevational distance of the drogue from the balloon.

9. The structure of claim 2, and means for varying the elevational distance of the drogue from the balloon.

10. A free balloon system having a predetermined ceiling altitude and comprising a balloon, a load suspended from the balloon and including a gondola having a tendency to rotate about the suspension axis, a winch mounted on the gondola, an anchor line wound on the winch, a drogue connected to the outer end of the line, the winch being operative to pay out the line and immerse the drogue in a part of the atmosphere where the wind is shear to the wind acting on the balloon when the system is at ceiling altitude.

References Cited in the file of this patent

UNITED STATES PATENTS

| | | |
|---|---|---|
| 152,145 | McGlashan | June 16, 1874 |
| 612,996 | Von Siegsfeld | Oct. 25, 1898 |
| 1,288,299 | Upson | Dec. 17, 1918 |
| 1,302,007 | Calthrop | Apr. 29, 1919 |

FOREIGN PATENTS

| | | |
|---|---|---|
| 522,526 | France | Aug. 1, 1921 |